Figure 1:
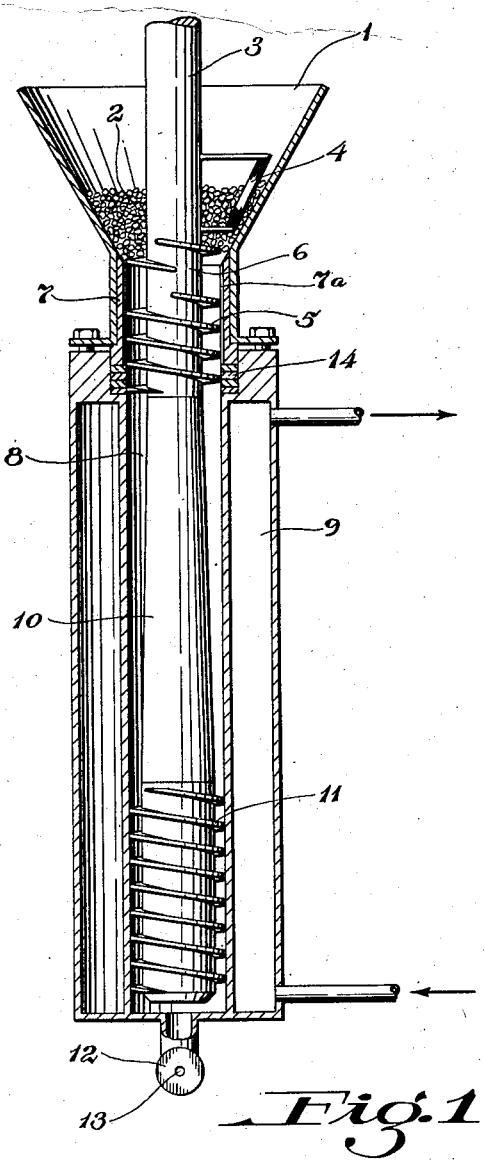
Figure 2:
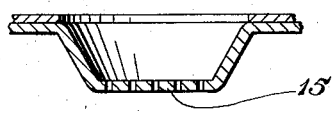

Feb. 27, 1945.     C. R. JOHNSON ET AL     2,370,469
APPARATUS FOR EXTRUSION OF ORGANIC MATERIALS
Filed Nov. 30, 1940

Charles R. Johnson
Roland R. Nydegger
INVENTOR

BY Thos. A. Wilson
ATTORNEY

Patented Feb. 27, 1945

2,370,469

UNITED STATES PATENT OFFICE 2,370,469

APPARATUS FOR EXTRUSION OF ORGANIC MATERIALS

Charles R. Johnson, Glenn Mills, Pa., and Roland R. Nydegger, Wilmington, Del., assignors to E. I. du Pont de Nemours & Company, Wilmington, Del., a corporation of Delaware Application November 30, 1940, Serial No. 367,882

1 Claim. (Cl. 18—12)

This invention relates to the extrusion of organic materials capable of flow at elevated temperatures.

The extruding methods and devices of the prior art are characterized by many disadvantages. For instance, none of these prior art means have been satisfactory for the extrusion of organic materials which are fusible compounds or crystalline compounds with sharp melting points.

The object of the present invention is new and improved extrusion means. A further object is new and improved extrusion apparatus. Another object is an extrusion apparatus especially suitable for crystalline organic compounds with sharp melting points. Other objects will be disclosed in the following.

We have found that the foregoing objects are accomplished when the organic material to be extruded is passed downward through a vertically arranged extrusion device including a vertical screw. Preferably the material is first fed into the device, passed downward through a sharply defined heating zone to be melted therein, and then through a metering zone to an extrusion orifice. Accordingly the apparatus preferably includes a vertically arranged screw disposed in a vertical chamber. Both the screw and chamber preferably are divided into three distinct zones, the feeding zone, the melting zone, and the metering zone.

As to the vertical screw itself, it is a preferred feature of the invention that the screw be a composite element, the upper or feeding portion being characterized by a metal composition or outer surface having a low heat transfer coefficient. Stainless steel is especially suitable for this purpose. The intermediate or melting portion of the screw disposed immediately below the feeding portion is characterized by a metal composition having a high heat transfer coefficient as compared with that of the feeding portion. Machine steel is especially suitable for constructing this portion of the screw. Immediately below this intermediate melting portion is the metering portion which, like the upper or feeding portion, is characterized by a low heat transfer coefficient. Stainless steel is suitable for this purpose.

The vertical chamber in which the vertical screw is disposed may be considered as comprising the three zones noted. The upper or feeding zone need not be heated. The intermediate or melting zone is surrounded by heating means. Preferably, insulating rings separate the feeding zone from the melting zone so that the material is subject to a sharp temperature change in passing from the safety zone into the melting zone. It is not necessary to heat the material further after it passes from the melting zone into the metering zone.

The invention will be more readily understood by referring to the accompanying drawing wherein a preferred embodiment is depicted. It is understood that this is for the purpose of illustration only and does not limit the scope of the invention in any way.

Figure I is a vertical elevation in cross-section of an apparatus according to the present invention. Figure II is a view of a conventional spinnerette.

The organic material is fed into the hopper 1 in the form of flakes and flows by gravity into the bottom of the hopper 2, where it surrounds the drive shaft 3 of the vertical screw. This screw is rotated by any conventional means, for instance by means of an overhead drive or the like. An agitator blade 4 revolves with the drive shaft and is fastened thereto. The flaked material is driven downward by the screw 5 which preferably has the thread interrupted, as shown at 6. This feeding portion of the screw works within the bushing 7, which is preferably roughened on its inner surface by longitudinal grooves 7a. We prefer to employ V grooves of uniform depth throughout the bushing.

The material is forced by the feeding portion of the screw from the feeding zone into the melting zone including the free space 8 surrounded by the heating jacket 9 which is filled with a mixture of diphenyl and diphenyl oxide vapors and preferably at a suitable temperature. The free space comprises the melting zone for the material fed into the same. The material is heated abruptly and melted sharply upon passing from the feeding portion of the screw into the melting zone. To aid in accomplishing this, the feeding portion 5 of the screw is preferably constructed of stainless steel which has a low heat transfer coefficient. A sharp line of division is maintained between this portion of the screw and the melting portion 10, which is constructed of machine steel having a high heat transfer coefficient. This effect is enhanced by the insulating rings 14 surrounding the juncture between the feeding and the melting zones.

The molten material from the melting zone passes into the metering zone surrounding the lower threaded metering portion of the screw 11. This metering portion has a smaller capacity than the upper feeding portion. The result is a building up of a certain amount of pressure in the heating or melting zone, which in turn favors rapid fusion because of the more intimate contact of the material with the hot side walls. Excessively high pressures in the melting zone are avoided by the groove proportions of the bushing which permit a certain amount of slippage.

The molten material passes from the metering screw into the extrusion head 12 from which it is extruded as a coating on the wire passing through the die 13. In addition to the heating jacket 9, additional heat may be supplied by the introduction of a heating unit into the screw shaft 3 in zone 10. Preferably, an electric resistant unit will be used and disposed just below the feeding zone. The construction of the extrusion head may conform to any conventional design. For instance any known insulating head may be employed for wire coating, the wire passing through the head 12 in conventional fashion, and receiving a coating as it passes through any conventional die therein; while the vertical apparatus is particularly advantageous for coating wire, it is likewise highly effective for the spinning of staple textile fibers. In this case the spinnerette 15 shown in Figure II would be attached at the base of the vertical assembly and the material spun therethrough. Similarly, the apparatus is suitable for the extrusion of bristles and even larger units including rods and the like. It is likewise advantageous for the production of decorative articles, strand coatings, and film casting.

While the method and apparatus are especially desirable for extruding organic materials having sharp melting points and crystalline structure, they may be employed also for plastic materials and the like, which are extrudable in a pliable condition.

The following examples serve to illustrate specific embodiments of the operation of our invention in the extrusion coating of electrical conductors, the extrusion of solid decorative beading, and the spinning of continuous filaments.

*Example 1*

Polyhexamethylene adipamide in the form of flakes was introduced into the hopper of an apparatus of the type illustrated in Figure I. By means of a vertically arranged screw, approximately 2" in diameter and rotating at a speed of 19 R. P. M., the material was fed into the melting chamber, which was surrounded by a heating jacket containing oil at a temperature of 294° C., so that the material was brought to molten condition. Under the pressure of the screw, the molten material passed through the metering portion of said screw and into the extrusion head. The temperature in the head was 289° C. The molten polyhexamethylene adipamide was then extruded as a coating, 0.006" thick, on a wire of 0.025" diameter, passing through the extrusion head at a speed of 700 ft. per minute. The cooled wire possessed excellent properties with respect to abrasion resistance, dielectric characteristics, and the like.

*Example 2*

In another run, similar material was passed through the hopper and screw, and fused in the melting chamber, the screw revolving at a speed of 22.5 R. P. M. The temperature in both heating jacket and extrusion head was 296° C. A coating of 0.008" thickness was applied to wire of the same diameter, the latter passing through the extrusion head at a speed of 900 ft. per minute. The coated wire possessed desirable properties.

*Example 3*

Polymerized methyl methacrylate was introduced in the form of small lumps into the hopper of an apparatus such as is illustrated in Figure I. The material was propelled downward to the heating chamber by means of the vertically arranged screw. The material became plastic here and was forced under pressure into the metering portion of the screw, and thence into the extrusion head. From here, it was extruded as an insulation coating on wire of 0.025" diameter. The temperature of the plastic polymerized methyl methacrylate was between 204 and 232° C. in the heating zone, and the same in the extrusion head. Coated wire of desirable properties was obtained.

*Example 4*

Cellulose acetate was likewise caused to pass through the same apparatus and was extruded in the form of solid, decorative beading of approximately 0.07" diameter. The temperature of the cellulose acetate in the heating chamber and in the extrusion head was between 204 and 218° C. Beading of excellent appearance was obtained.

The present invention offers many advantages over the extrusion means of the prior art. Whereas the conventional horizontal screws are defective because they bite only as the thread passes the hopper opening, the vertical screw according to the present invention takes in material continuously. This makes possible uniform feeding of the material and hence does not impose a feed pulse on the metering zone in the apparatus and hence permits an effective metering step in the process. This feature is especially desirable for molten materials, namely organic materials of sharp melting point which assume a liquid rather than a plastic state upon heating. Such materials must have a continuous feeding or they cannot be properly extruded. The well-defined feeding, melting, and metering zones described in the foregoing are highly effective in achieving this continuous feeding which makes possible metering and improved extrusion results. Furthermore, the process is one favored by gravity, a feature not present in the conventional horizontal extrusion arrangements.

It should be emphasized that the various segments of the screw contribute greatly to the preferred embodiment of the invention, the metering section having a capacity for molten or plastic material smaller than that of the feeding portion. This insures pressure upon the material within the heating zone and consequently more rapid heating or melting, because of the more intimate contact with the hot walls of the apparatus. It is also possible, although not essential, to preheat the material during its passage down through the bushing within which the feeding screw works prior to entering the melting zone, by transfer of heat through the walls.

In Figure I the shank of the screw in the melting chamber is shown as tapering, thus contacting the root diameters of the feeding and metering screws and allowing a smaller volume between screw shank and chamber as it approaches the metering section. While such tapering of shank is effective, the shank may be cylindrical and the length of the tapered portion may be long or short, as desired.

Various materials can be extruded advantageously in accordance with our invention, for example high melting compounds such as polyhexamethylene adipamide, polyhexamethylene sebacamide, the polyhexamethylene amide of acelaic acid, and interpolymers of these with one another and with other polymeric materials; cellulose derivatives such as ethyl cellulose, cellulose acetate, and the like; polyvinyl acetals, including polyvinyl formal, polyvinyl butyral, and others; polyvinyl ketones; polymerized methacrylates; and many other types of compounds.

It will be understood that many variations and details may be made without departure from the scope of the invention. We intend to be limited only by the following patent claim.

We claim:

An extrusion apparatus comprising a vertically disposed chamber including a feeding zone, a melting zone and a metering zone, a composite vertical screw disposed within said chamber including a feeding segment of stainless steel within said feeding zone, a melting segment of machine steel within said melting zone, and a metering segment of stainless steel within said metering zone, and an extrusion head connected to the base of said chamber.

CHARLES R. JOHNSON.
ROLAND R. NYDEGGER.